United States Patent [19]

Bradshaw et al.

[11] Patent Number: 4,943,375

[45] Date of Patent: Jul. 24, 1990

[54] THE PROCESS OF SEPARATING A SELECTED ION FROM A PLURALITY OF OTHER IONS IN A MULTIPLE ION SOLUTION BY CONTACTING THE SOLUTION WITH A MACROCYCLIC LIGAND BONDED TO SILICA WHICH SELECTIVELY COMPLEXES WITH THE DESIRED ION

[75] Inventors: Jerald S. Bradshaw; Reed M. Izatt; Ronald L. Bruening, all of Provo; James J. Christensen, deceased, late of Provo, all of Utah, by Virginia Christensen, successor in title

[73] Assignee: Brigham Young University, Provo, Utah

[21] Appl. No.: 240,689

[22] Filed: Sep. 6, 1988

Related U.S. Application Data

[63] Continuation-in-part of Ser. No. 93,544, Sep. 4, 1987, abandoned.

[51] Int. Cl.$^5$ ............................................. B01D 15/00
[52] U.S. Cl. ................................... 210/674; 210/679; 210/688
[58] Field of Search ............... 210/662, 670, 672, 679, 210/684, 688, 674; 436/73, 77, 80, 81, 161, 178

[56] References Cited

U.S. PATENT DOCUMENTS 4,452,702 6/1984 Blasius et al. ........................ 210/638
4,659,512 4/1987 Macedo et al. ...................... 210/688

Primary Examiner—Ivars Cintins
Attorney, Agent, or Firm—Thorpe, North & Western

[57] ABSTRACT

The invention has composition of matter and process aspects. The composition of matter aspect relates to the compounds selected from the class consisting of:

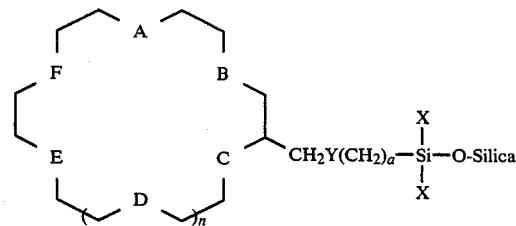

1. A-F = any combination of O or OCH$_2$ or S or SCH$_2$ or N—R or N(R)CH$_2$ (R = H or any alkyl or benzyl); n = −1 to 4; X = any alkyl or Cl or alkoxy or O-Silica; Y = O or CH$_2$; a = 1-16. (Generic)

2. A-F = O; n = 0-2; X = CH$_3$ or Cl or alkoxy or O-Silica; Y = O or CH$_2$; a = 1-16. (Species 1)

3. A,C,D,F = O; B and E = N—R (R = H or alkyl or benzyl); n =0-2; X = CH$_3$ or Cl or alkoxy or O-Silica; Y = O or CH$_2$; a = 1-16. (Species 2)

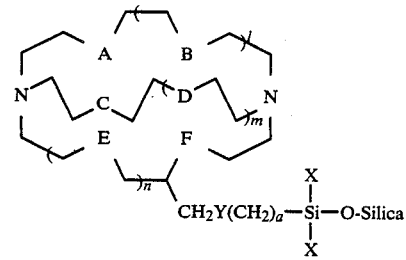

1. A-F = any combination of O or S or N—R (R = H or any alkyl or benzyl); l, m, n = 0-2; X = any alkyl or Cl or alkoxy or O-Silica; Y = O or CH$_2$; a = 1-16. (Generic)

2. A-F = O; l = m = n = 1; X = CH$_3$ or Cl or alkoxy or O-Silica; Y = O or CH$_2$; a = 1-16. (Species)

(Abstract continued on next page.)

-continued n = 0–2; X = CH$_3$ or Cl or alkoxy
or O-Silica; a = 1–18.

-continued
n = 0–2; R = H, any alkyl or aryl; X = CH$_3$
or Cl or alkoxy or O-Silica; Y = O or CH$_2$;
a = 1–16.

l = 0, 1, 2; R = H, lower alkyl, aryl;
X = CH$_3$ or alkoxy or Cl or O-Silica;
Y = O or CH$_2$; a = 1–16 in which Silica is sand or silica gel.

The process aspect involves the use of any of these compounds packed in a column through which a solution of the multiple ions is flowed to complex with the compound and separate a desired selected ion from a multiple ion solution, breaking the complex by flowing a receiving liquid through the column to free the desired ion and recovering the freed desired ion from the receiving liquid.

14 Claims, 2 Drawing Sheets

Fig. 1

Silica-O-Si(X)(X)—(CH$_2$)$_a$YCH$_2$-Crown

Glass Wool

Fig. 2

1. A-F = any combination of O or OCH$_2$ or S or SCH$_2$ or N-R or N(R)CH$_2$ (R = H or any alkyl or benzyl); n = -1 to 4; X = any alkyl or Cl or alkoxy or O-Silica; Y = O or CH$_2$; a = 1 - 16.

2. A-F = O; n = 0-2; X = CH$_3$ or Cl or alkoxy or O-Silica; Y = O or CH$_2$; a = 1 - 16.

3. A,C,D,F = O; B and E = N-R (R = H or alkyl or benzyl); n = 0-2; X = CH$_3$ or Cl or alkoxy or O-Silica; Y = O or CH$_2$; a = 1 - 16.

In which Silica is sand or silica gel

Fig. 3

1. A-F = any combination of O or S or N-R (R = H or any alkyl or benzyl); l, m, n = 0-2; X = any alkyl or Cl or alkoxy or O-Silica; Y = O or CH$_2$; a = 1 - 16.

2. A-F = O; l = m = n = 1; X = CH$_3$ or Cl or alkoxy or O-Silica; Y = O or CH$_2$; a = 1 - 16.

In which Silica is sand or silica gel

Fig. 4 n = 0-2; X = CH$_3$ or Cl or alkoxy or O-Silica; a = 1 - 18.

In which Silica is sand or silica gel

Fig. 5 n = 0-2; R = H, any alkyl or aryl; X = CH$_3$ or Cl or alkoxy or O-Silica; Y = O or CH$_2$; a = 1 - 16.

In which Silica is sand or silica gel

Fig. 6 l = 0, 1, 2; R = H, lower alkyl, aryl; X = CH$_3$ or alkoxy or Cl or O-Silica; Y = O or CH$_2$; a = 1-16

In which Silica is sand or silica gel

Fig. 7 Plot of the concentration of strontium in a solution originally containing 0.001 M Sr and 1 M Mg coming out of the bottom of the column which contains bonded 18C6 vs. the volume of the solution which has been flowed through the column

THE PROCESS OF SEPARATING A SELECTED ION FROM A PLURALITY OF OTHER IONS IN A MULTIPLE ION SOLUTION BY CONTACTING THE SOLUTION WITH A MACROCYCLIC LIGAND BONDED TO SILICA WHICH SELECTIVELY COMPLEXES WITH THE DESIRED ION

This application is a continuation-in-part of our prior application Ser. No. 07/093,544, filed 09/04/87, which is abandoned in favor of this application.

INTRODUCTION

The present invention comprises a composition of matter and a process of using it. The composition of matter comprises silica, e.g. sand or silica gel, having a covalent bond to certain macrocyclic compounds through a hydrocarbon chain with or without an ether oxygen linkage. These certain macrocyclic compounds have at least four — A $CH_2$ — $CH_2$ — groups in which A is selected from 0, 0 — $CH_2$, S, S — $CH_2$, N — R, and N — (R) — $CH_2$ in which R is selected from H, lower alkyl, and benzyl and the hydrocarbon chain has an end group covalently bonded to silica in which X is selected from lower alkyl, phenyl, benzyl, halogen, — O — $CH_3$, — O — $C_2H_5$, and — O — Silca.

Representative families of compounds contemplated by the present invention are illustrated by the following structural formulae I to V.

According to the present invention a composition of matter comprises silica covalently bonded to a macrocyclic compound and having the formula I, II, III, IV or V below:

Formula I

1. A–F = any combination of O or $OCH_2$ or S or $SCH_2$ or
   N-R or $N(R)CH_2$ (R = H or any alkyl or benzyl);
   n = −1 to 4; X = any alkyl or Cl or alkoxy or O-Silica;
   Y = O or $CH_2$; a = 1–16. (Generic)
2. A–F = O; n = 0–2; X = $CH_3$ or Cl or alkoxy or O-Silica;
   Y = O or $CH_2$; a = 1–16. (Species 1)
3. A,C,D,F = O; B and E = N-R (R = H or alkyl or benzyl);
   n = 0–2; X = $CH_3$ or Cl or alkoxy or O-Silica;
   Y = O or $CH_2$; a = 1–16. (Species 2)

Formula II

1. A–F = any combination of O or S or N–R(R = H or
   any alkyl or benzyl); m, n = 0–2;
   X = any alkyl or Cl or alkoxy or O-Silica;
   Y = O or $CH_2$; a = 1–16. (Generic)
2. A–F = O; l = m = n = 1; X = $CH_3$ or Cl or alkoxy
   or O-Silica; Y = O or $CH_2$; a = 1–16. (Species)

Formula III n = 0–2;
X = $CH_3$ or Cl or alkoxy or O-Silica;
a = 1–18.

Formula IV n = 0–2;
R = H, any alkyl or aryl;
X = $CH_3$ or Cl or alkoxy or O-Silica;
Y = O or $CH_2$;
a = 1–16.

Formula V l = 0, 1, 2; R = H, lower alkyl, aryl;
X = $CH_3$ or alkoxy or Cl or O-Silica;
Y = O or $CH_2$;
a = 1–16.

The process comprises selectively and quantitatively removing and concentrating a selected ion or group of ions present at low concentrations from a plurality of other ions in a multiple ion solution in which the other ions may be present at much higher concentrations by bringing the multiple ion solution into contact with a compound of the invention. The preferred embodiment disclosed herein involves carrying out the process by bringing a large volume of the multiple ion solution into contact with a compound of the invention as an addition compound to sand or silica gel in a separation column through which the mixture is first flowed to complex the desired ion or ions with said compound followed by the flow through the column of a small volume of a receiving liquid to break the complex by chemical or thermal means, dissolve the desired ions and carry them out of the column. Other equivalent apparatus may be used instead of a calcium, e.g., a slurry which is filtered, washed with a receiving liquid to break the complex and recover the desired ion. The desired metal ions are then recovered from the receiving phase by well known procedures.

More particularly, the process comprises forming a chemical covalent bond between silica, preferably sand or silica gel, and at least one of the compounds, placing the resulting bonded silica in a contacting device such as a tall column, causing a large volume of the mixture of ions to flow through the column where the desired ions complex with the bonded silica which separates them from the rest of the mixture which flows out of the column, then flowing a small volume of the receiving liquid through the column to break the complex and dissolve and carry out of the column the desired ion(s). The desired metal ions are then recovered from the receiving phase by well known procedures.

BACKGROUND OF THE INVENTION

The fact is known that macrocyclic polyethers and other macrocyclic ligands present as solutes in a solvent such as water are characterized by their ability to selectively form strong bonds with particular ions or groups or ions present as solutes in the same solvent according to size, donor atom-related related and other well known selectivity rules as noted in articles by R.M. Izatt, J.S. Bradshaw, S.A. Nielsen, J.D. Lamb, J.J. Christensen, and D.Sen, *THERMODYNAMIC AND KINETIC DATA FOR CATION.MACROCYCLE INTERACTION*. Chem. Rev., 1985, Vol. 85, 271–339 and by L.F. Lindoy, in *PROGRESS IN MACROCYGLIC CHEMISTRY*, edited by R.M. Izatt and J.J. Christensen, *JOHN WILEY & SONS*, pages 53–92 (1987). However, researchers have not previously been able to incorporate macrocycles into separation systems where the behavior of the macrocycle in the separation system in comparison to that of the macrocycle as a solute is unchanged and/or the macrocycle will remain in the separation system. Articles such as those entitle *ION-CHROMATOGRAPHIC SEPARATION OF SILICA GRAFTED WITH BENZO-*18CROWN-6-ETHER by M. Lauthard and Ph. Germain, J. Liquid Chromatogr., 1985, Vol. 8, 2403–2415, and *ION-CHROMATOGRAPHY ON POLY (CROWN ETHER-MODIFIED) SILICA POSSESSING HIGH AFFINITY FOR SODIUM* by M. Nakajima, K. Kumura, E. Hayata and T. Shono, J. Liquid Chromatogr., 1984. Vol. 7, 2115–2125, have disclosed the bonding of crown ethers to silica gels but they and most other reported macrocycle bonded silicas contain a benzene group or other electron withdrawing groups as part of a macrocycle side chain which reduces the ability of the macrocycle to bond with ions in comparison to the situation where the macrocycle and ions are present as solutes in solution. The only other reported examples of bonding of macrocycles to sand or silica gel have involved bonding via a side chain connected to one of the electron rich macrocycle donor atoms, i.e., nitrogen. One such reference is entitled *AN OXYGEN.NITROGEN DONOR MACROCYCLE IMMOBILIZED ON SILICA GEL. A REAGENT SHOWING HIGH SELECTIVITY FOR Cu(II) IN THE PRESENCE OF Co(II). Ni(II) OR Zn(II)*, by V. Dudler, L.F. Lindoy. D. Sallin, C.W. Schlaepfer. Aust. J. Chem., 1987, Vol. 40, p. 1557. However, such bonding changes the geometry of the compound and greatly reduces the ability of the macrocycle to interact with ions. Prior researchers in this field confined their research to analytical chromatographic applications and disclosed no concept of industrial separation applications where strong macrocycle.ion bonding is required to quantitatively recover the desired ion(s) from solution and high selectivity is required to obtain a product free from contaminants. The strength of macrocycle-ion bonding is particularly important when ions present in solution at low concentrations need to be recovered. The greater the value of the equilibrium constant for ion.macrocycle interaction, the lower the initial concentration of the ion in solution can be and still be efficiently and quantitatively complexed. Hence, the ability to attach these macrocycles to sand or silica gel without reducing the ability of the macrocycle to complex ions is of the utmost importance in the industrial use of macrocycles. The process of the present invention successfully accomplished this feat.

SUMMARY OF THE INVENTION

The compounds of the present invention comprise certain macrocyclic ligands covalently bonded to silica, e.g., sand or silica gel. The compounds are identified above. The process of the present invention uses the compounds, which are characterized by high selectivity for and removal of desired metal ions or groups of metal ions present at low concentrations from the source phase containing a mixture of metal ions with the ions one does not desire to remove present in much greater concentrations in the solution, in a separation device such as a column through which the solution is flowed. The process of selectively removing and concentrating the desired ion(s) is characterized by the ability to quantitatively complex from a large volume of solution the desired ion(s) when they are present at low concentrations. The said ions are recovered from the separation column by flowing through it a small volume of a receiving phase which contains a solubilized reagent which need not be selective, but which will strip the ions from the macrocyclic ligand quantitatively. The recovery of the desired metal ions from the receiving phase is easily accomplished by well known procedures.

BRIEF DESCRIPTION OF THE DRAWINGS

The invention will be described and illustrated by reference to the drawings in which.

DESCRIPTION OF THE PREFERRED EMBODIMENT OF THE INVENTION

PREPARATION OF MATERIALS

Macrocycles which do not contain electron withdrawing groups and which are capable of being bonded to silica must be synthesized. Then the macrocycle must be covalently bonded to the sand or silica gel.

Figure 1:
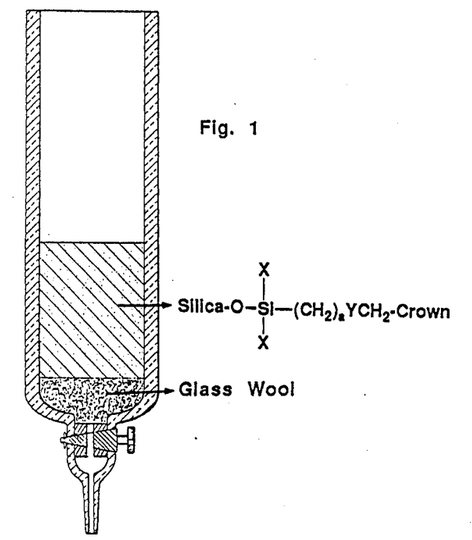
FIG. 1 represents schematically a suitable column for holding the silicamacrocyclic ligand (crown) materials through which a solution of metal ions can be flowed to complex selectively with a desired ion or group of ions in accordance with the invention.
Figure 2:
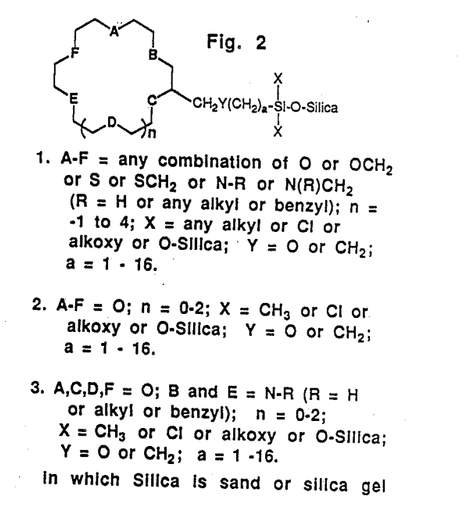
FIG. 2–6 represent the group of families of neutral macrocyclic ligands covalently bonded to silica comprising the compounds of the invention.

One method of preparing the compounds of FIG. 2 for example, is to react the allyloxy forms of the crowns with chlorodimethylsilane (or dichloromethylsilane) followed by heating the resulting chlorosilane (or dichlorosilane) with silica as follows:

n = 0 or 1 or 2
X = $CH_3$ or Cl or alkoxy or O-Silica
Y = O or $CH_2$; a = 1-16 l = 0 or 1 or 2
m = 0 or 1 or 2
n = 0 or 1 or 2
X = $CH_3$ or Cl or alkoxy or O-Silica
Y = O or $CH_2$; a = 1-16

The synthesis of the allyloxy forms of the crowns, which is not part of the present invention, is described in an article entitled *FACILE SYNTHESIS OF HYDROXYMETHYLCROWN ETHERS* by I. Ikeda, H.E. Mura and M. Okahara, Synthesis pages 73 and 74 (1984), which is incorporated herein by reference.

Figure 3:
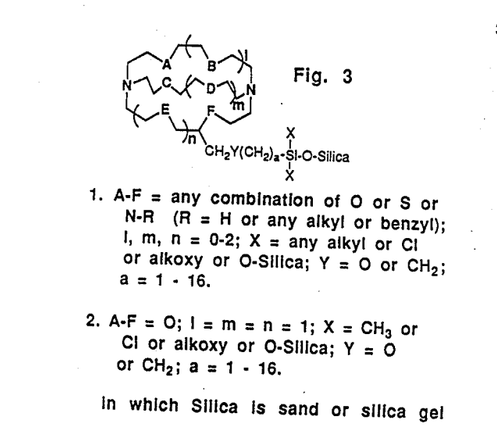

A method for preparing the macrocyclic compounds of FIG. 3 is to react the cryptand compound having a —$CH_2$—O-$CH_2$CH=$CH_2$ side chain with chlorodimethylsilane (or dichloromethylsilane) in the presence of a platinum catalyst to convert the side chain to —$CH_2$—O—$(CH_2)_3$—Si($CH_3$)ClX (where X = (Cl or $CH_3$) and heating this compound with silica as follows:

The synthesis of the —$CH_2$—$_O$—$_{CH2}$CH=$CH_2$ substituted 2.2.2 cryptand (=n =1) which is not part of the present invention, is described in an article entitled *SYNTHESIS OF HYDROXYMETHYL-FUNCTIONALIZED DIAZACROWNS AND CRYPTANDS* by David A. Babb, Bronislaw P. Czech and Richard A. Bartsch, J. Heterocyclic Chem., Vol. 23, pages 609, 613 (1986), which is incorporated herein by reference.

Figure 4:
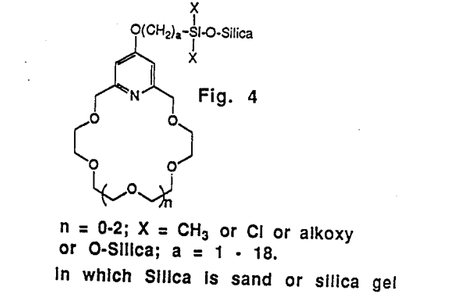
Figure 5:
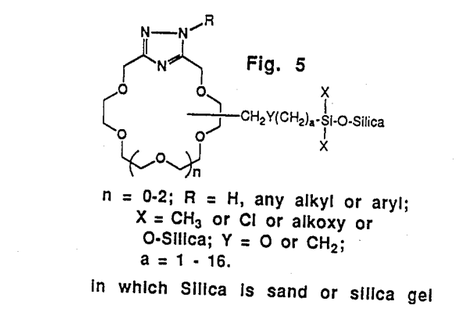
Figure 6:
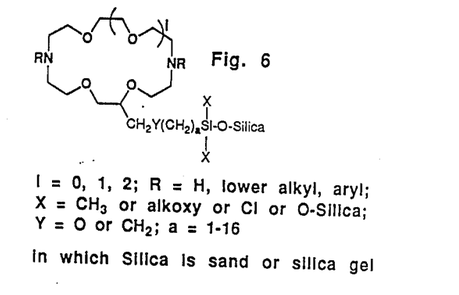

A method of preparing the macrocyclic compounds of FIG. 4, for example, is to react 4-allyloxypyridino-18-crown-6 with chlorodimethylsilane (or dichloromethylsilane) and heating the resulting chlorosilane and silica as follows:

n = 0-2, X = CH₃ or Cl or O-Silica; a = 1-18

The synthesis of 4-allyloxypyridino—18-crown-6 (where n=1), which is not part of the present invention, is described in an article entitled *PROTONIONIZABLE CROWN ETHERS. 3. SYNTHESIS AND STRUCTURAL STUDIES OF MACROCYCLIC POLYETHER LIGANDS CONTAINING A 4-PYRIDINE SUBCYCLIC UNIT*, by Jerald S. Bradshaw, Yohji Nakatsuji, Peter Huszthy, Bruce E. Wilson, N. Kent Dalley and Reed M. Izatt, J. Heterocyclic Chem. Vol. 23, pages 353–360 (1986), which is incorporated herein by reference.

It should be emphasized that any macrocycle which can by synthesized with a —CH₂-CH₂CH=CH₂ side chain or the like attached to one of the regular carbon atoms of the macrocycle could then be covalently bonded to sand or silica gel. The interaction properties of this bonded macrocycle will not differ from those of the unsubstituted macrocycle present as a solute in solution when such a macrocycle does not contain electron withdrawing substituent groups and the bonding to sand or silica gel does not occur via one of the macrocycle donor atoms. This will now be described in more detail in the following description of the metal ion recovery and concentration process.

METAL ION RECOVERY AND CONCENTRATION

The metal ion recovery and concentration process of the invention relates to the selective recovery of desired metal ions from mixtures thereof with other metal ions using the compounds of the invention as defined above. Effective methods of recovery and/or separation of metal ions, particularly silver, lead, cadmium, and other heavy metals, from one another in culinary water supplies, waste solutions deposits and industrial solutions and silver recovery from waste solutions, e.g., from emulsions on photographic and X-ray film, represent a real need in modern technology. These ions are typically present at flow concentrations in solutions containing other ions at much greater concentrations. Hence, there is a real need for a process to selectively recover and concentrate these hazardous and/or desirable ions. The present invention accomplishes this separation effectively and efficiently by the use of compounds selected from the families represented by FIGS. 2-5.

The process first involved selecting a macrocycle-bonded silica where the particular macrocycle will selectively complex the ion(s) of interest. There is a large data base for measurements of macrocycle.ion interactions where the macrocycle is unsubstituted and present as a solute in a solvent. Much of this data base is presented in an article by R.M. Izatt, J.S. Bradshaw, S.A. Nielsen, J.D. Lamb, J.J. Christensen. and D. Sen, *THERMODYNAMIC AND KINETIC DATA FOR CATION.MACROCYCLE INTERAGTION*, Chem. Rev. Vol. 85, 271-339 (1985). Previously, this data base has only provided general qualitative predictions about the behavior of macrocycles incorporated into separation processes. However, in the process of the invention the equilibrium constants for ionmacrocycle interaction for macrocycles present as solutes in solution vs. that for macrocycles bonded to silica show little or no variation. Data comparing the interaction of several ions with both types of the macrocycle 18-crown.6 are given as an example of this point in Table 1. It is emphasized that similar interaction with metal ions of the bonded macrocycle and macrocycle in solution is only obtained when electron withdrawing groups are not attached to the macrocycle and when the macrocycle is not attached to the silica via one of the donor atoms of the macrocycle.

The data base for macrocycle.cation interaction can be used in choosing a macrocycle for recovering a particular cation. The selective removal and

TABLE 1.

Comparison of Aqueous Equilibrium Constants for 1:1 Cation-18-Crown-6 Interaction with the Macrocycle Free in Solution vs. being Bound to Silica Gel

| Cation | Log $K^a$ | |
|---|---|---|
| | Free Macrocycle | Bound Macrocycle |
| $Sr^{2+}$ | 2.72 | 2.6[b] |
| $Tl^{+}$ | 2.27 | 2.2[b] |
| $Ba^{2+}$ | 3.87 | 3.7[b] |
| $Pb^{2+}$ | 4.27 | 4.0[c] |

TABLE 1.-continued
Comparison of Aqueous Equilibrium Constants for 1:1 Cation-18-Crown-6 Interaction with the Macrocycle Free in Solution vs. being Bound to Silica Gel

| Cation | Log $K^a$ | |
|---|---|---|
| | Free Macrocycle | Bound Macrocycle |
| $Ni^{2+}$ | 0 | $0.2^b$ |

[a]Log K values for the free macrocycle, which are not part of the present invention, are taken from R.M. Izatt, J.S. Bradshaw, S.A. Nielsen, J.D. Lamb, J.J. Christensen, and D. Sen, THERMODYNAMIC AND KINETIC DATA FOR CATION-MACROCYCLE INTERACTION, Chem. Rev., Vol. 85, 271-339 (1985). Log K values for the bound macrocycle were determined by us.
[b]Ionic strength = 3 M.
[c]Ionic strength = 1 M.

recover of $Pb^{2+}$ and $Ba^{2+}$ from aqueous solutions using 18-crown6 bonded to silica gel are examples of a suitable choice of macrocycle for a specific need. The data base measurements indicate that $Pb^{2+}$ and $Ba^{2+}$ are selectively complexed by 18-crown-6 by at least an order of magnitude over all other cations. The selectivity over cations often present in large excess (i.e., $Na^{30\ pl}$, $K^{30}$, $Mg^{2+}$, $Ca^{2+}$) is much greater. The equilibrium constant values in Table 1 confirms the suitability of the choice of 18-crown6 as an appropriate macrocycle for the task. The 18-crown-6 bonded silica gel has been tested for its ability to remove $Pb^{2+}$ from $H_2O$. These data are presented in Table 2. The dimensions.

TABLE 2.
The Reduction of $Pb^{2+}$ Concentrations in Aqueous Solution Using an 18-Crown-6 Bonded Silica Gel Column$^a$

| Initial $Pb^{2+}$ Concentration (ppm) | Final $Pb^{2+}$ Concentration (ppm) | Volume of $Pb^{2+}$ Solution (ml) |
|---|---|---|
| $207^b$ | $<30^c$ | 50 |
| $10^d$ | $<30^c$ | >250 |
| $20^e$ | $<30^c$ | 100 |

[a]The cylindrical column used was 1.90 cm in diameter and contained a 3.5 cm height of the materials. The gel capacity was 5.3 moles of macrocycle/m³ silica gel.
[b]$Mg^{2+}$ was also present at a concentration of 1 Molar.
[c]30 ppb is the detection limit of the atomic absorption spectrophotometer.
[d]$Mg^{2+}$ and $Ca^{2+}$ were also present at 0.6 and 0.003 Molar, respectively.
[e]$Mg^{2+}$ was also present at 0.7 Molar.

and capacity of the small column used are given as footnotes to the table. The data in Table 2 show that great reductions in aqueous $Pb^{2+}$ concentrations can be achieved using the 18-crown-6 bonded silica gel column even when another cation is present in solution at much greater concentrations. Silica gel can interact with ions to some degree in and of itself. However, tests using a plain silica gel column under conditions identical to those performed with the macrocycle bonded silica gel showed that the aqueous stream $Pb^{2+}$ concentration reductions were not as great. In particular, the plain silica gel column performed quite poorly under conditions where cations other than $Pb^{2+}$ were present at much greater concentrations than that of $Pb^{2+}$. The effect of silica gel or sand interaction with ions flowing through the column can be minimized by blocking the majority of the .OH sites present with trimethylsilyl groups.

Figure 7:
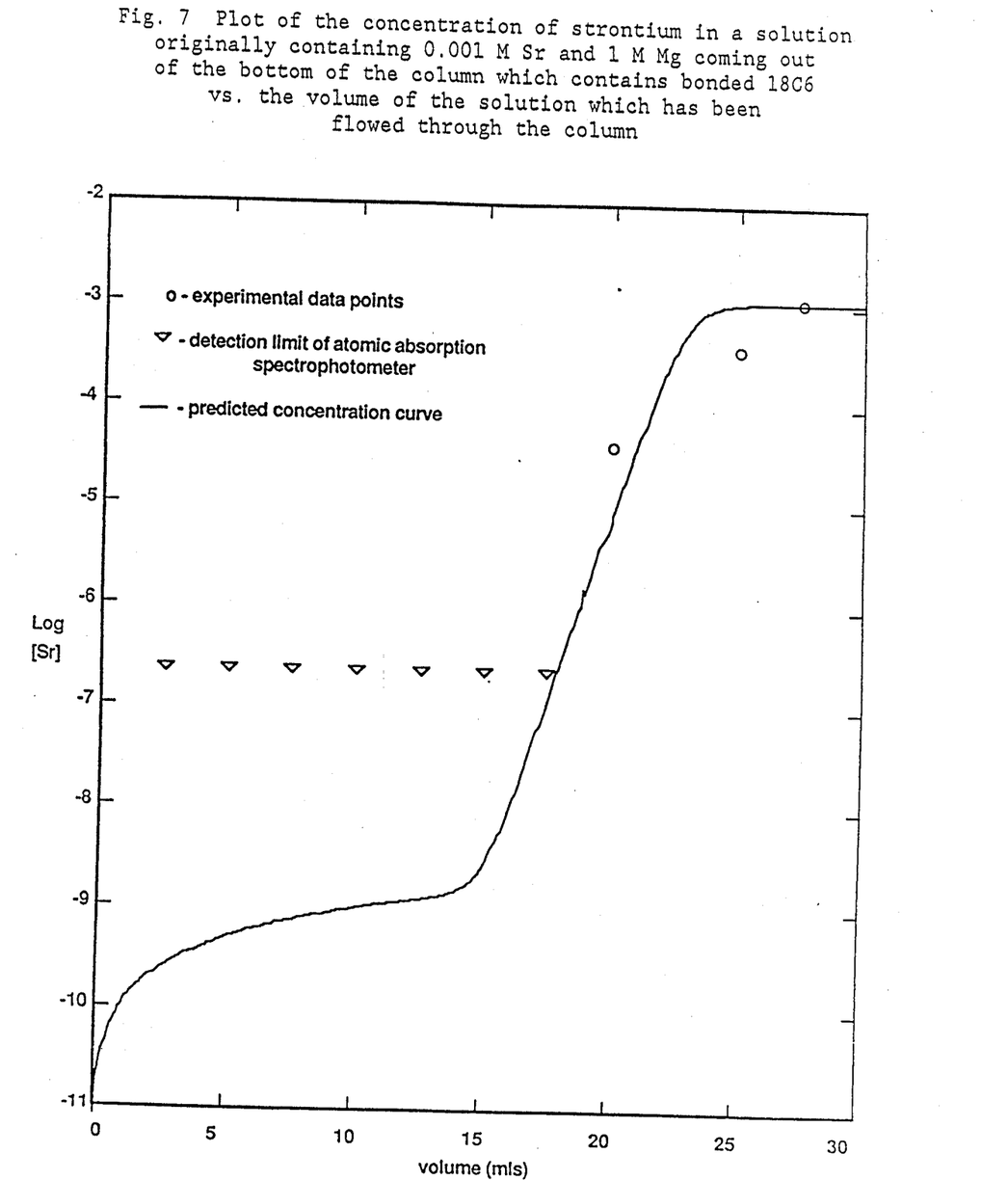
FIG. 7 represents a graph of the predicted (o points) and actual (curve) remaining amount of $Sr^{2+}$ in a solution initially containing 1 M $MgCl_2$ and 0.001 M $SrCl_2$ after flowing the solution through an 18-crown-6 bonded silica gel column vs. the amount of volume of the solution which has been passed through the column. The analytical detection limit is listed for those experimental points where no $Sr^{2+}$ could be detected.

The same 18-crown-6 bonded silica gel column has also been tested for its ability to selectively remove $Sr^{2+}$ from a solution containing 1 M $MgCl_2$ and 0.001 M $SrCl_2$. The molar concentrations of $Sr^{2+}$ in the aqueous stream coming out of the bottom of the column vs. the corresponding volumes of solution which have been flowed through the column are plotted as the exponential points in FIG. 7. A predicted $Sr^{2+}$ concentration vs. volume plot is also shown (solid line). The predicted plot was obtained by numerically solving the partial differential mass balance equation for the column using the equilibrium constant for $Sr^{2+}$ could be removed from the aqueous source phase.

Once the desired ion(s) are attached to the silica gel column they must be removed using a small volume of a receiving phase so that a concentrated and purified product is obtained. In the $Pb^{2+}$ and $Sr^{2+}$ recovery tests described, 99% of the purified $Pb^{2+}$ or $Sr^{2+}$ was recovered from the column using 25 ml of a concentrated basic solution of either ethylenediamine tetraacetate (EDTA), citrate or acetate. These reagents form stronger complexes with the ion(s) that the macrocycle does. Hence, they can effectively strip ion(s) from the macrocycle. These ion-receiving phase reagent complexes are easily broken by adding acid to the solution. These species can be recovered as a solid if desired. For example, the $Pb^{2+}$ can be recovered as a solid by using $H_2SO_4$ as the acid and, hence, precipitating $PbSO_4$.

An example of the use of these materials and processes is the quantitative and selective removal of undesired heavy metals such as $Pb^{2+}$ from blood. The silica-gel bonded macrocycle 18-crown-6 (FIG. 2. A - F =oxygen, n =1) selectively complexes $Pb^{2+}$ over $K^+$, $Na^+$, $Ca^{2+}$, $Fe^{3+}$, proteins and other materials necessary in the body by at least 2 orders of magnitude.

Although the invention has been described and illustrated by reference to certain specific macrocyclic ligands and processes of using them, analogs of these macrocycles are within the scope of the compounds and processes of the invention as defined in the following claims.

Having thus described and illustrated the invention, what is claimed is:

1. The process of separating a selected ion from a plurality of other ions in a multiple ion solution comprising by flowing the multiple ion solution through a column packed with a composition of matter comprising silica covalently bonded to a hydrocarbon chain covalently bonded to a macrocyclic compound having at least four A-C-C groups in which A is selected from O, O - $CH_2$, S, S - $CH_2$, N - R and N - (R) - $CH_2$ in which R is selected from H, methyl. alkyl and benzyl, and the hydrocarbon chain has an end group which is covalently bonded to the silica and in which X is selected from lower alkyl, benzyl, phenyl, halogen, - O - $CH_3$, - O - $C_2H_5$ and - O - Silica.

2. A process of separating a selected ion from a plurality of other ions in a multiple ion solution comprising by flowing the multiple ion solution through a column packed with a composition of matter comprising silica covalently bonded to a macrocyclic compound from the classes consisting of:

A-F = any combination of O or S or N—R (R = H or any alkyl or benzyl); n = 0–4; X = any alkyl or Cl or alkoxy or O-Silica; Y = O or CH₂; a = 1–16.

A-F = any combination of O or S or N—R (R = H or any alkyl or benzyl); l, m, n = 0–2; X = any alkyl or Cl or alkoxy or O-Silica; Y = O or CH₂; a = 1–16.

n = 0–2, a = 1–18; X = CH₃ or Cl or alkoxy or O-Silica n = 0–2; R = any alkyl; a = 1–16; X = CH₃ or Cl or alkoxy or O-Silica l = 0, 1, 2; R = H, lower alkyl, aryl; X = CH₃ or alkoxy or Cl or O-Silica; Y = O or CH₂; a = 1–16

In which Silica is sand or silica gel under conditions which cause said composition of matter to complex with the selected ion and remove it from said multiple ion solution, separating said multiple ion solution from which said selected ion has been removed from said complex, and breaking said complex to free and recover said selected ion in a receiving liquid.

3. The process as set forth in claim 2 in which said silica is silica gel.

4. The process as set forth in claim 2 in which said silica is sand.

5. A process of separating a selected ion from a plurality of other ions in a multiple ion solution as set forth in claim 2 comprising flowing the multiple ion solution through a column packed with a composition of matter having the structural formula:

A-F = O; n = 0–2; X = CH₃ or Cl or alkoxy or O-Silica.

6. A process of separating a selected ion from a plurality of other ions in a multiple ion solution as set forth in claim comprising flowing the multiple ion solution through a column packed with a composition of matter having the structural formula:

A, C, D, F = O; B and E = N—R (R = H or alkyl or benzyl); n = 0–2; X = CH₃ or Cl or alkoxy or O-Silica.

7. A process of separating a selected ion from a plurality of other ions in a multiple ion solution as set forth in claim 2 comprising flowing multiple ion solution through a column packed with a composition of matter having the structural formula:

A-F = any combination of O or S or N—R (R = H or any alkyl or benzyl); n = 0-4;
X = any alkyl or Cl or alkoxy or O-Silica Gel.

8. A process of separating a selected ion from a plurality of other ions in a multiple ion solution as set forth in claim 2 comprising flowing multiple ion solution through a column packed with a composition of matter having the structural formula:

A-F = O; n = 0-2; X = CH$_3$ or Cl or alkoxy or O-Silica Gel.

9. A process of separating a selected ion from a plurality of other ions in a multiple ion solution as set forth in claim 2 comprising flowing multiple ion solution through a column packed with a composition of matter having the structural formula:

A, C, D, F = O;
B and E = N-R(R = H or alkyl or benzyl);
n = 0-2;
X = CH$_3$ or Cl or alkoxy or O-Silica Gel.

10. A process of separating a selected ion from a plurality of other ions in a multiple ion solution as set forth in claim 2 comprising flowing multiple ion solution through a column packed with a composition of matter having the structural formula:

A-F = any combination of O or S or N-R(R = H or any alkyl or benzyl);
l, m, n = 0-2;
X = any alkyl or Cl or alkoxy or O-Silica Gel.

11. A process of separating a selected ion from a plurality of other ions in a multiple ion solution as set forth in claim 2 comprising flowing multiple ion solution through a column packed with a composition of matter having the structural formula:

A-F = O;
l = m = n = 1;
X = CH$_3$ or Cl or alkoxy or O-Silica Gel.

12. A process of separating a selected ion from a plurality of other ions in a multiple ion solution as set forth in claim 2 comprising flowing multiple ion solution through a column packed with a composition of matter having the structural formula:

n = 0-2;
X = CH$_3$ or Cl or alkoxy or O-Silica Gel;

13. A process of separating a selected ion from a plurality of other ions in a multiple ion solution as set forth in claim 2 comprising flowing multiple ion solution through a column packed with a composition of matter having the structural formula:

n = 0–2;
R = H, any alkyl;
X = CH₃ or Cl or alkoxy or O-Silica Gel

14. A process of separating a selected ion from a plurality of other ions in a multiple ion solution as set forth in claim 2 comprising flowing multiple ion solution through a column packed with a composition of matter having the structural formula:

l = 0, 1, 2;
R = H, lower alkyl, aryl;
X = CH₃ or alkoxy or Cl or O-Silica Gel;
Y = O or CH₂;
a = 1–16.

* * * * *